(12) United States Patent
Kim et al.

(10) Patent No.: US 7,263,256 B2
(45) Date of Patent: Aug. 28, 2007

(54) OPTICAL CONNECTION BLOCK, OPTICAL MODULE, AND OPTICAL AXIS ALIGNMENT METHOD USING THE SAME

(75) Inventors: Dong-Su Kim, Anyang-si (KR); Hyo-Hun Park, Daejeon (KR); Byung-Sup Rho, Daejeon (KR); Han-Seo Cho, Daejeon (KR); Sun-Tae Jung, Anyang-si (KR)

(73) Assignee: Samsung Electronics Co., Ltd., Suwon-Si, Gyeonngi-Do (KR)

( * ) Notice: Subject to any disclaimer, the term of this patent is extended or adjusted under 35 U.S.C. 154(b) by 0 days.

(21) Appl. No.: 10/959,884

(22) Filed: Oct. 6, 2004

(65) Prior Publication Data
US 2005/0220437 A1    Oct. 6, 2005

(30) Foreign Application Priority Data
Apr. 2, 2004    (KR) .................... 10-2004-0022908
Apr. 2, 2004    (KR) .................... 10-2004-0022909

(51) Int. Cl.
  *G02B 6/26*    (2006.01)
  *G02B 6/42*    (2006.01)

(52) U.S. Cl. .................... 385/32; 385/31; 385/40

(58) Field of Classification Search ................ 385/14, 385/31–48
See application file for complete search history.

(56) References Cited

U.S. PATENT DOCUMENTS

| | | | | |
|---|---|---|---|---|
| 4,323,300 A | * | 4/1982 | Stewart et al. ................ | 385/65 |
| 4,732,446 A | * | 3/1988 | Gipson et al. ................ | 385/24 |
| 5,253,310 A | * | 10/1993 | Delbare et al. ................ | 385/14 |
| 5,339,376 A | * | 8/1994 | Kakii et al. .................... | 385/71 |
| 5,603,870 A | * | 2/1997 | Roll et al. .................. | 264/1.25 |
| 5,809,197 A | * | 9/1998 | Delbare et al. ............. | 385/139 |
| 6,027,253 A | * | 2/2000 | Ota et al. ..................... | 385/83 |
| 6,163,639 A | * | 12/2000 | Ollier et al. .................. | 385/32 |
| 6,285,808 B1 | * | 9/2001 | Mehlhorn et al. ............ | 385/14 |
| 6,330,377 B1 | * | 12/2001 | Kosemura .................... | 385/14 |
| 6,483,960 B2 | * | 11/2002 | Schroedinger ............... | 385/14 |
| 6,739,761 B2 | * | 5/2004 | Tsukamoto et al. .......... | 385/89 |
| 6,742,937 B2 | * | 6/2004 | Lee et al. ..................... | 385/78 |
| 6,804,423 B2 | * | 10/2004 | Tsukamoto et al. .......... | 385/14 |
| 6,817,776 B2 | * | 11/2004 | Colgan et al. ................ | 385/59 |
| 6,907,151 B2 | * | 6/2005 | Yunus .......................... | 385/14 |
| 2001/0028768 A1 | * | 10/2001 | Terashima .................... | 385/49 |
| 2002/0131727 A1 | * | 9/2002 | Reedy et al. ................. | 385/88 |

(Continued)

*Primary Examiner*—Michelle Connelly-Cushwa
*Assistant Examiner*—Rhonda S. Peace
(74) *Attorney, Agent, or Firm*—Cha & Reiter, LLC

(57) ABSTRACT

An optical module is disclosed. The optical module includes a substrate, and at least one planar optical waveguide that includes a plurality of waveguides and at least one groove vertically penetrating the upper surface of the substrate and which is successively laminated on the substrate. The optical module also includes at least one PCB having at least one integrated photoelectric conversion device that is positioned on the planar optical waveguide facing a corresponding groove, and at least one optical connection block including a body and optical fibers embedded in the body in such a manner that both ends thereof are exposed to the lateral and upper surfaces of the body. The optical connection block is inserted into the corresponding groove of the planar optical waveguide in such a manner that both ends of the optical fibers, which have been exposed, face the waveguides and the PCBs, respectively.

8 Claims, 17 Drawing Sheets

U.S. PATENT DOCUMENTS

| | | | |
|---|---|---|---|
| 2003/0113090 A1* | 6/2003 | Lee et al. | 385/137 |
| 2003/0169994 A1* | 9/2003 | Steinberg et al. | 385/137 |
| 2003/0231834 A1* | 12/2003 | Massey et al. | 385/52 |
| 2004/0258359 A1* | 12/2004 | Corkum et al. | 385/39 |
| 2005/0169597 A1* | 8/2005 | Colgan et al. | 385/137 |
| 2005/0196096 A1* | 9/2005 | Ohtsu et al. | 385/14 |
| 2005/0213922 A1* | 9/2005 | Sezerman et al. | 385/137 |
| 2006/0045418 A1* | 3/2006 | Cho et al. | 385/31 |

* cited by examiner

OPTICAL CONNECTION BLOCK, OPTICAL MODULE, AND OPTICAL AXIS ALIGNMENT METHOD USING THE SAME

CLAIM OF PRIORITY

This application claims priority to an application entitled "optical connection block, optical module, and optical axis alignment method using the same," filed with the Korean Intellectual Property Office on Apr. 2, 2004 and assigned Ser. No. 2004-22908 and an application filed on Apr. 2, 2004 with the same title and assigned Ser. No. 2004-22909, the contents of which are hereby incorporated by reference.

BACKGROUND OF THE INVENTION

1. Field of the Invention

The present invention relates to an optical module, and more particularly to an optical module including a printed circuit board (PCB) having a plurality of integrated photoelectric conversion devices and an optical axis alignment method.

2. Description of the Related Art

In general, PCBs have a structure that include copper wiring laminated on a plastic board made of epoxy resin, polyimide resin, or phenol resin. However, such PCBs are not suitable for high-speed, long-distance, communication devices. More specifically, communication devices connected by copper lines cannot easily transmit data with a high transmission rate of a few Gb/sec or more, even at short distances of tens of centimeters, due to high loss rate and noise generation.

Optical communication devices, which replace the copper lines by optical fiber lines, can be used to establish high-speed, long-distance, communication networks. Such optical communication networks use optical signals as a medium for data transmission and need an optical module including photoelectric conversion devices for generating optical signals from electric signals, as well as for receiving optical signals and outputting electric signals.

The conventional optical module includes a planar optical waveguide device, which is composed of waveguides for inputting/outputting optical signals, and a PCB glued on the planar optical waveguide device.

The PCB has integrated photoelectric conversion devices that generate and detect optical signals, as well as converting the optical signals into electric signals. The photoelectric conversion devices may include surface emission type light sources or surface reception type optical detection devices. In other words, the optical module needs devices for optically connecting the PCB to the planar optical waveguide device.

FIG. 1 shows the structure of a conventional optical connection block 100. The conventional optical connection block 100 includes a block 120, a plurality of optical fibers 110 mounted within the block 120 as a medium for transmitting/receiving optical signals, and a reflection layer 121 formed on an end of the block 120, which is processed to have a predetermined angle.

The block 120, which supports the optical fibers 110, has a plurality of V-grooves (not shown) formed thereon for holding and seating the optical fibers 110. The end of the block 120 is processed so that it has a predetermined angle.

The optical connection block 100 optically connects a PCB (not shown) formed on a planar optical waveguide (not shown) to the planar optical waveguide by processing an end of the block 120 with a predetermined angle and forming the reflection layer 121 on the processed surface.

As the planar optical waveguide, a PLC (planar lightwave circuit) including a plurality of waveguides manufactured by a semiconductor process or an optical fiber block including a plurality of optical fibers may be used. The PCB has integrated active optical conversion devices that convert optical signals into electric signals and vice versa.

FIG. 2 shows the construction of an optical system 200 that includes first and second optical modules 220 and 230, respectively. The optical modules 220 and 2230 are connected by an optical fiber 210. The first and second optical modules 220 and 230 include planar optical waveguides 221 and 231 and PCBs 222 and 232 positioned on the corresponding planar optical waveguides 221 and 231. The PCBs 222 and 232 have integrated photoelectric conversion devices that convert optical signals into electric signals or vice versa.

The optical fiber 210 connects the first and second optical modules 220 and 230 to each other.

However, conventional optical connection blocks have a problem in that they are difficult to manufacture. More specifically, it is difficult to process an end of the blocks in such a manner that it has an end surface slanted with a predetermined angle. If the angle of the processed end surface varies, the path of optical signals is changed, and noise and intensity loss occur.

In addition, conventional optical connection blocks have a bulky structure because the optical modules are integrated with optical fibers. This limits the application of the blocks to optical modules or optical communication systems that require a compact size.

SUMMARY OF THE INVENTION

One aspect of the present invention relates to an optical module that improves optical axis alignment. Another aspect of the invention relates to optical module that is easier to manufacture, as compared to the conventional devices described above.

One embodiment of the present invention is directed to optical module including a substrate, at least one planar optical waveguide that includes a plurality of waveguides, at least one groove and which is successively laminated on the substrate. The optical module also includes PCBs having at least one integrated photoelectric conversion device and positioned on the planar optical waveguide in such a manner that each photoelectric conversion device faces the corresponding groove. The optical module also includes at least one optical connection block including a body and optical fibers embedded in the body in such a manner that both ends thereof are exposed to the lateral and upper surfaces of the body. The optical connection block is inserted into the corresponding groove of the planar optical waveguide in such a manner that both ends of the optical fibers, which have been exposed, face the waveguides and the PCBs, respectively.

Another embodiment of the present invention is directed to an optical axis alignment method for an optical module including a planar optical waveguide having at least one groove and optical connection blocks. The method includes the steps of creating at least two metal electrodes on the planar optical waveguide in such a manner that they are exposed to a base surface of the groove and forming metal wiring for electrically connecting the metal electrodes to a surface of the optical connection blocks, which contacts the base surface of the groove. The method further includes the steps of seating the optical connection blocks in the groove, applying currents to the metal electrodes and aligning the optical connection blocks to the planar optical waveguide according to a change of current detected through the metal electrodes.

Another embodiment of the present invention is directed to an optical axis alignment method for an optical module including a planar optical waveguide having at least one groove and optical connection blocks. The method includes the steps of creating at least two first alignment patterns on a substrate, which has the groove formed thereon, forming second alignment patterns, which correspond to the first alignment patterns, on the optical connection blocks and seating the optical connection blocks into the groove in such a manner that the second alignment patterns of the optical connection blocks contact the first alignment patterns of the groove.

Another embodiment of the present invention is directed to an optical axis alignment method for an optical module including a planar optical waveguide having at least one groove and optical connection blocks. The method includes the steps of inserting the optical connection blocks into the groove and performing optical axis alignment on the optical connection blocks and a corresponding waveguide while observing the image of the corresponding waveguide, which is projected through the optical connection blocks from a camera positioned on an end of the optical connection blocks.

Yet another embodiment of the present invention is directed to an optical axis alignment method for an optical module including a planar optical waveguide having at least one groove and optical connection blocks. The method includes the steps of inserting the optical connection blocks into the groove and detecting the image of a corresponding waveguide through the optical connection blocks. The method further includes the step of performing optical axis alignment on the optical connection blocks and the corresponding waveguide using the image detected through the optical connection blocks.

A further embodiment is directed to an optical axis alignment method for an optical module including a planar optical waveguide having at least one groove, and optical connection blocks. The method includes the steps of inserting the optical connection blocks into the groove, irradiating light on an end of the optical connection blocks for performing optical axis alignment on the planar optical waveguide and the corresponding optical connection blocks and aligning the optical connection blocks to the grooves of the planar optical waveguide by detecting the light, which has been irradiated on the optical connection blocks, from an end of the planar optical waveguide.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. In the following description of the present invention, a detailed description of known functions and configurations incorporated herein will be omitted when it may obscure the subject matter of the present invention.

Figure 1:
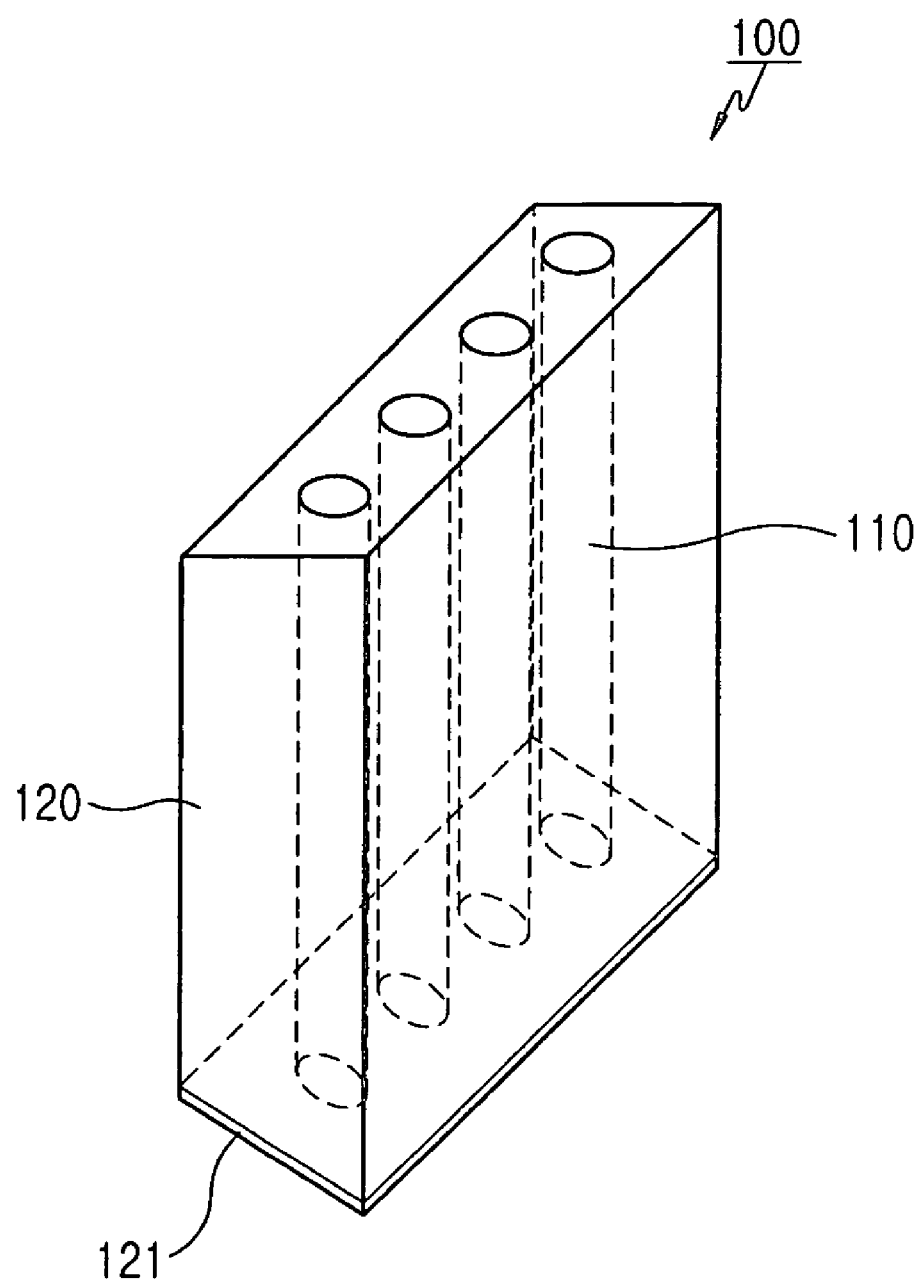
FIG. 1 shows the structure of a conventional optical connection block.
Figure 2:
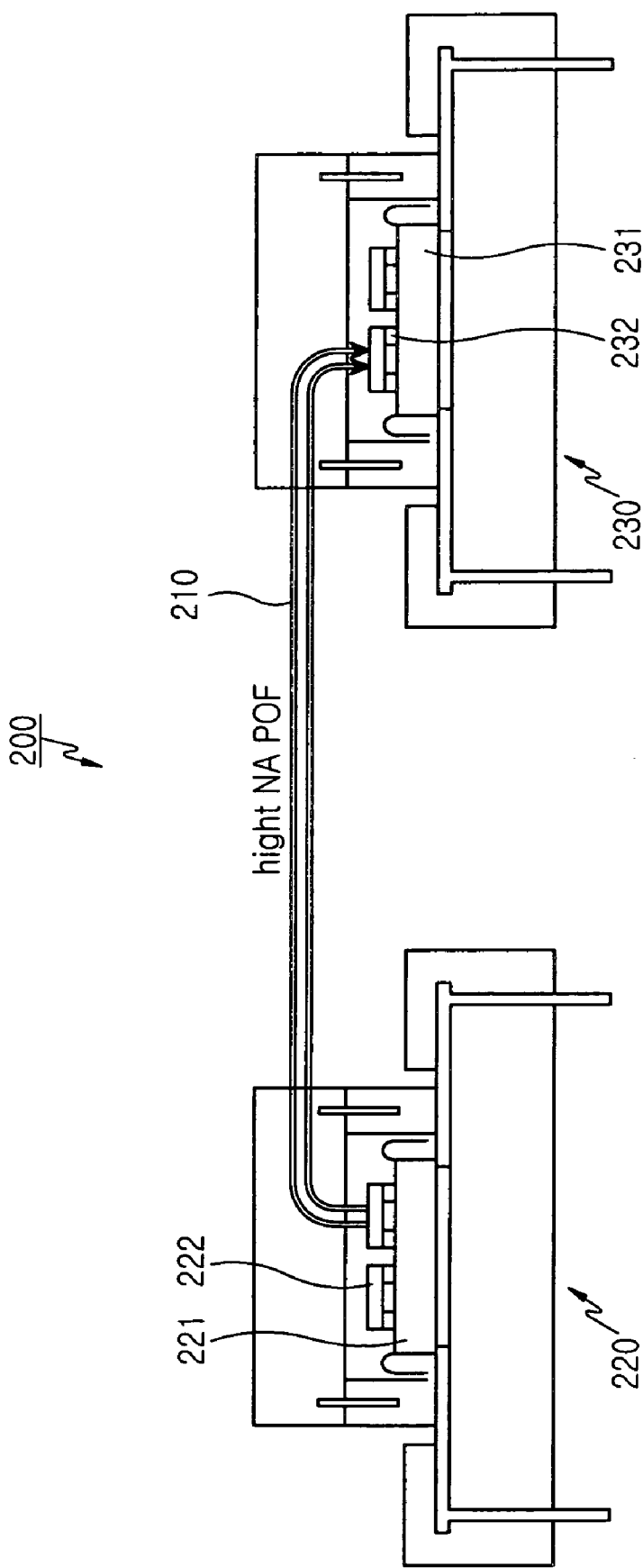
FIG. 2 briefly shows the construction of a conventional optical system wherein optical modules are connected by an optical fiber.
Figure 3A:
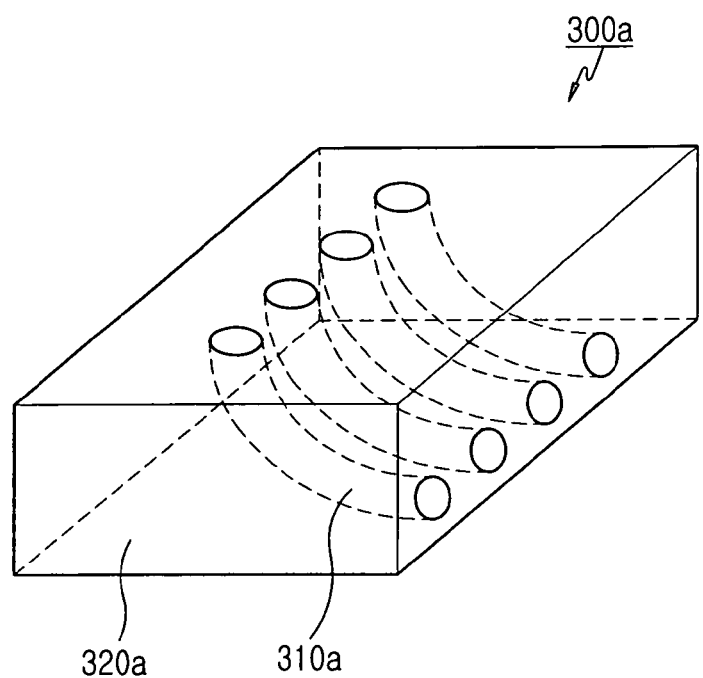
FIG. 3A is a perspective view showing an optical connection block according to a first embodiment of the present invention.
Figure 3B:
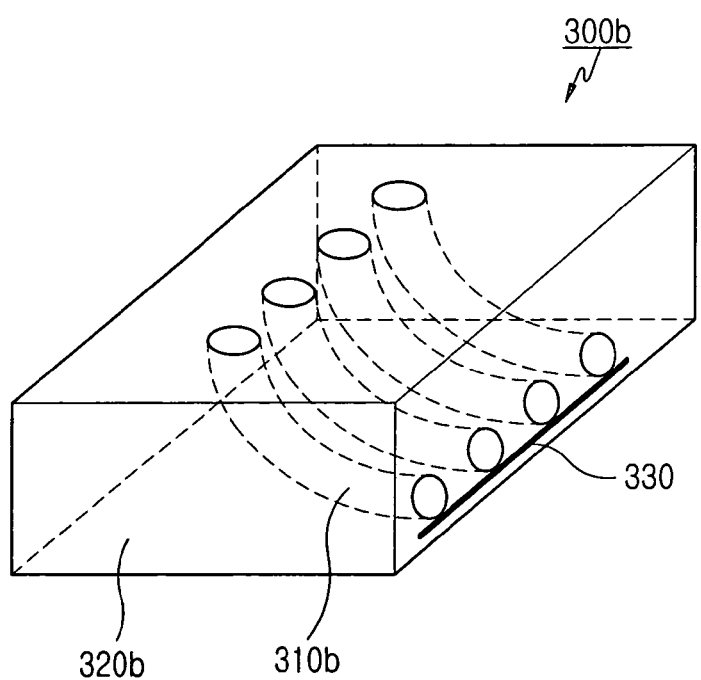
FIG. 3B is a perspective view showing an optical connection block according to a second embodiment of the present invention.
Figure 3C:
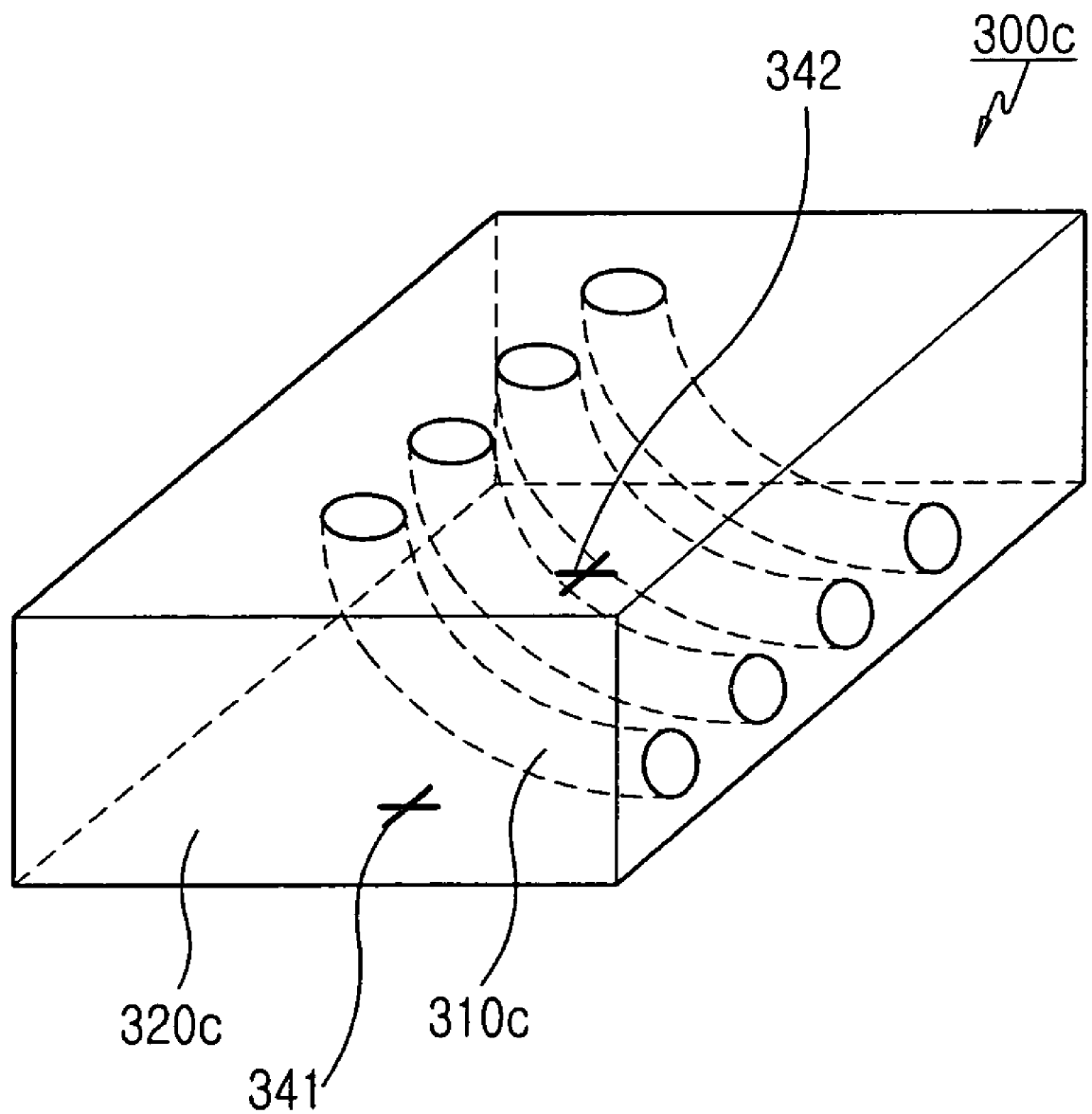
FIG. 3C is a perspective view showing an optical connection block according to a third embodiment of the present invention.

FIGS. 3A to 3C are perspective views showing optical connection blocks according to first, second, and third embodiments of the present invention. Referring to FIGS. 3A to 3C, optical connection blocks 300a, 300b, and 300c include bodies 320a, 320b, and 320c and a plurality of optical fibers 310a, 310b, and 310c embedded in the bodies 320a, 320b, and 320c. The optical connection block 300b shown in FIG. 3B further includes electric wiring 330 of metallic material formed on a side thereof. However, the electric wiring 330 may be formed at various locations on the body 320b.

The optical connection block 300c shown in FIG. 3c further includes alignment patterns 341 and 342 formed on the lower portion thereof for optical axis alignment. The alignment patterns 341 and 342 are used to manually align the optical connection block 300C to a corresponding groove (not shown) of a planar optical waveguide (not shown). The base surface of the corresponding groove has marks for manual alignment formed at locations corresponding to those of the alignment patterns 341 and 342. The optical connection block 300C is seated in the corresponding groove in such a manner that the alignment patterns 341 and 342 coincide with the corresponding marks. The first and second alignment patterns 341a, 341b, 342a, and 342b may be formed of metallic material.

The bodies 320a, 320b, and 320c may be formed as a single body of a cuboid shape using plastic material including epoxy resin, polyamide resin, phenol resin, and wax or other material including glass, ceramic, or metal. The lateral and upper surfaces of the bodies 320a, 320b, and 320c, to which both ends of the optical fibers 310a, 310b, and 310c are exposed, may be polished into smooth surfaces, so that scattering due to irregular reflection of input/output optical signals, as well as resulting noise and intensity loss, can be suppressed.

The optical fibers 310a, 310b, and 310c are embedded in the bodies 320a, 320b, and 320c in such a manner that both ends thereof are exposed. As shown in the embodiment of FIGS. 3A-3C, the ends are exposed to the lateral and upper surfaces of the bodies 310a, 310b, and 310c, respectively. The optical fibers 310a, 310b, and 310c may be, for example, silica or plastic optical fibers. Both ends of the optical fibers 310a, 310b, and 310c are exposed to adjacent surfaces of the bodies 320a, 320b, and 320c. Specifically, the optical fibers 310a, 310b, and 310c are bend with a predetermined curvature and have both ends exposed to adjacent sectional surfaces of the bodies 320a, 320b, and 320c, so that the path of input/output optical signals is turned into a perpendicular direction. If the lateral and upper surfaces of the bodies 320a, 320b, and 320c, to which the optical fibers 310a, 310b, and 310c are exposed, are polished and the locations of both ends of the optical fibers 310a, 310b, and 310c are correctly aligned, the coupling loss can be decreased to −1 dB or less. If the optical fibers 310a, 310b, and 310c are bent with a curvature radius of 1 mm or more, the bending loss of a general multi-mode optical fiber is −3 dB or less. Consequently, in the case of establishing an optical communication system using an optical module including the above optical connection block, the coupling loss of the receiving side, combined with that of the transmitting side, can be maintained at −8 dB or less.

It is noted that conventional optical communication systems have a detection limit of −16 dBm, and the optical output of optical transmission side is about 1 dBm. As a result, an optical communication system including an optical connection block having a loss of −8 dBm can easily maintain the detection limit of −16 dBm.

Figure 4A:
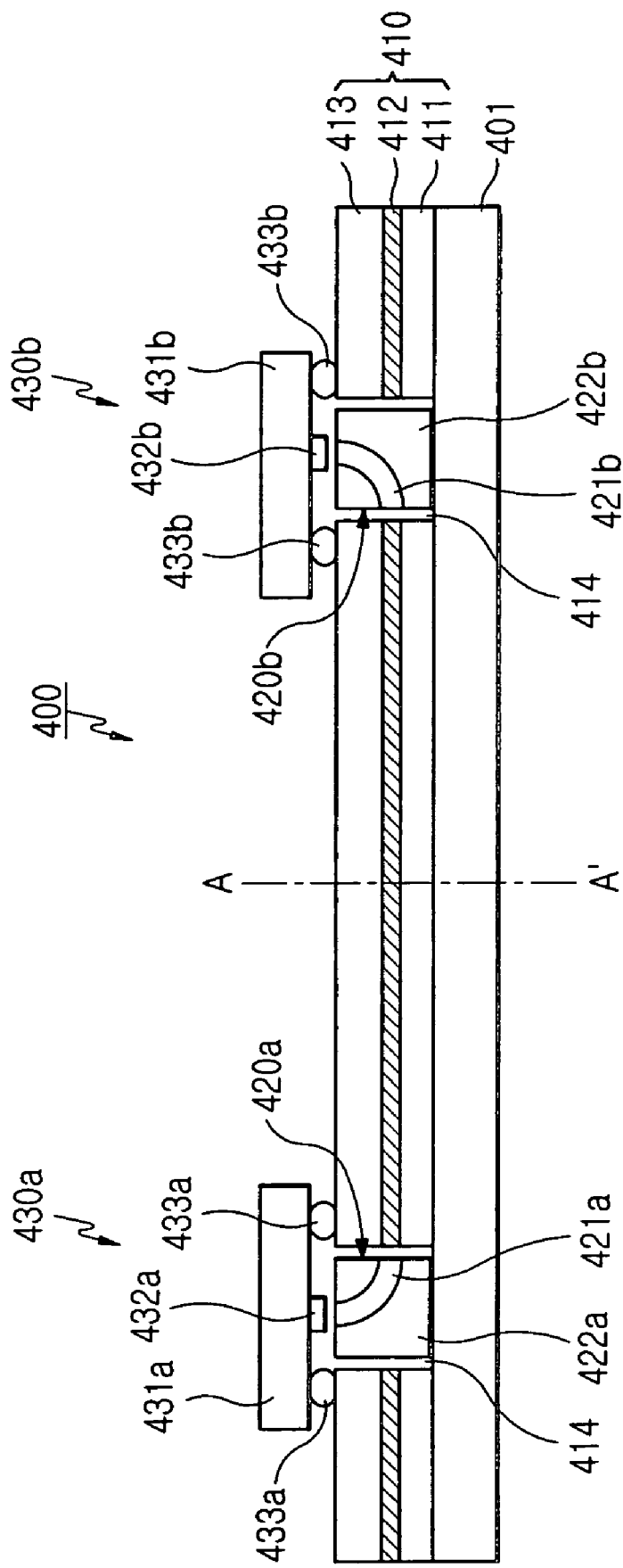
FIG. 4A shows an optical module including an optical connection block according to a fourth embodiment of the present invention.
Figure 4B:
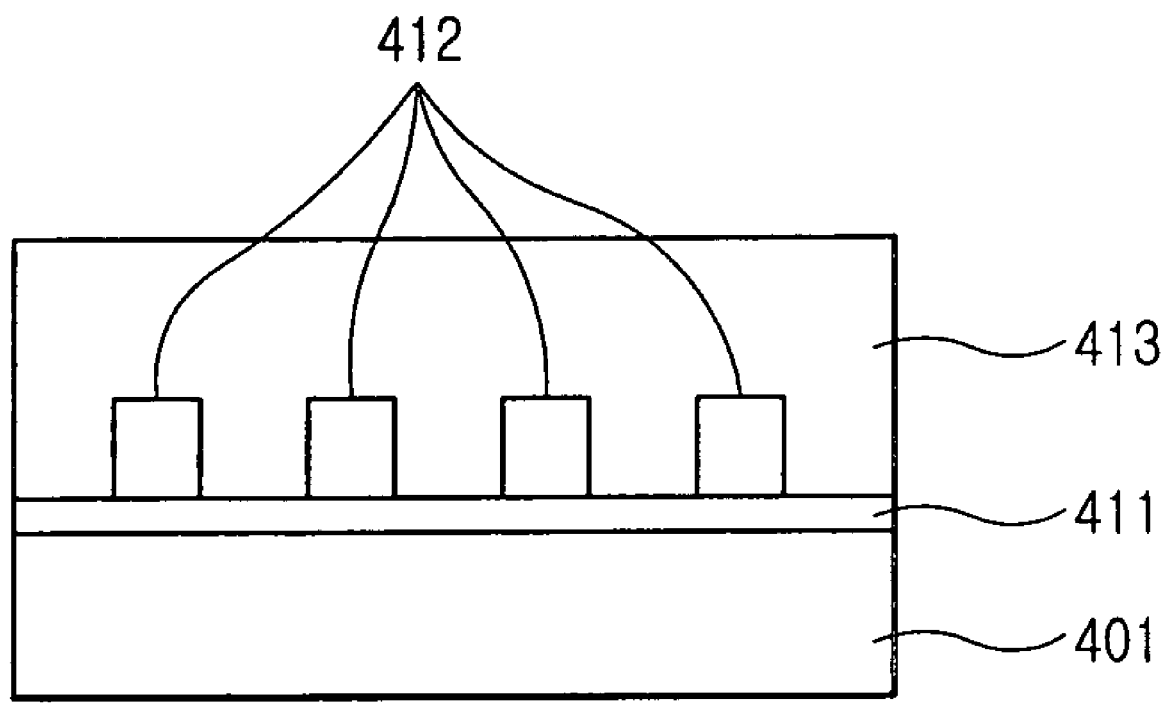
FIG. 4B is a sectional view showing the structure of a planar optical waveguide shown in FIG. 4A.

FIG. 4A shows an optical module including an optical connection block according to a fourth embodiment of the present invention. FIG. 4B is a sectional view of the structure of a planar optical waveguide shown in FIG. 4a taken along line A-A'. Referring to FIGS. 4A and 4B, an optical module 400 includes a substrate 401, a planar optical waveguide 410 formed on the substrate 401, at least one PCB, and a plurality of optical connection blocks 420a and 420b.

The planar optical waveguide 410 may be created on the substrate 401 by a semiconductor process. and the planar optical waveguide 410 includes a plurality of waveguides 412 and a plurality of grooves 410a and 410b. The planar optical waveguide 410 has a lower clad 411, a core (not shown), and an upper clad 413 that may be successively laminated on the substrate 401. More specifically, after a lower clad 411 and a core layer are successively laminated on the substrate 401, the core layer is processed by an etching process to form a plurality of waveguides 412. The upper clad 413 is grown on the lower clad 411, on which the waveguides 412 have been formed, to complete a planar optical waveguide 410.

The PCBs may include a first and a second PCB 430a and 430b, respectively, on which at least one photoelectric conversion device is integrated. The first and second PCBs 430a and 430b may be positioned on the planar optical waveguide 410 in such a manner that a first and a second photoelectric conversion device 432a and 432b, respectively, face the base surface of the corresponding grooves 410a and 410b. The photoelectric conversion devices 432a and 432b may include surface emission type light sources or surface reception type optical detectors.

The optical connection blocks 420a and 420b may include a first optical connection block 420a corresponding to the first PCB 430a and a second optical connection block 420b corresponding to the second PCB 430b. If necessary, additional optical connection blocks may be used.

The first and second optical connection blocks 420a and 420b include bodies 422a and 422b and optical fibers 421a and 421b embedded in the bodies 422a and 422b in such a manner that both ends thereof are exposed. For example, the ends may be exposed to the lateral and upper surfaces of the bodies 422a and 422b. The first and second optical connection blocks 420a and 420b are inserted into the respective grooves 410a and 410b of the planar optical waveguide 410 in such a manner that both ends of the optical fibers 421a and 421b face the waveguides 412 and corresponding PCBs 430a and 430b, respectively.

The first and second optical connection blocks 420a and 420b have the same structure as in the case of the first embodiment of the present invention shown in FIG. 3A. More specifically, the optical fibers of the optical connection module of the fourth embodiment of the present invention is arranged in a line so that that they face the waveguides. Detailed descriptions of the first and second optical connection blocks 420a and 420b will be omitted.

Figure 4C:
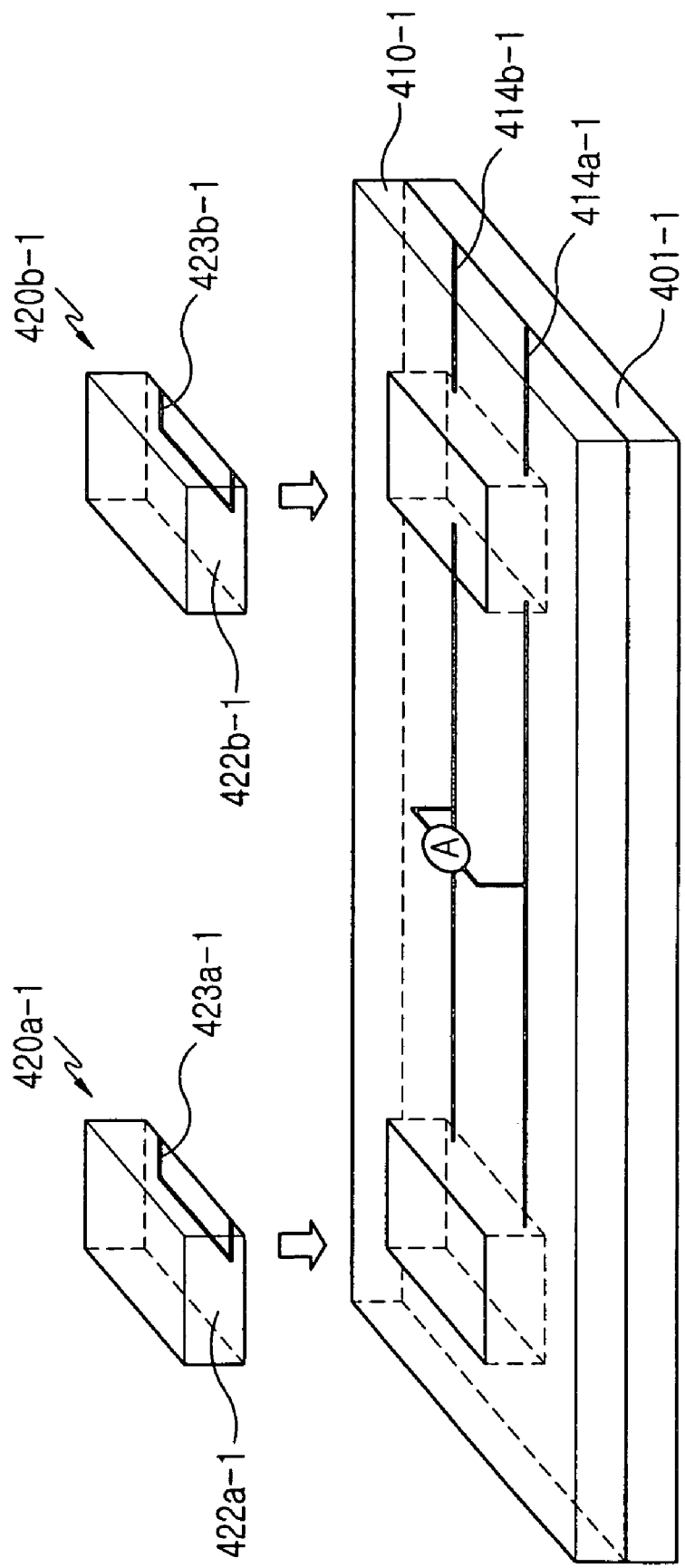
FIG. 4C illustrates an optical axis alignment procedure of the optical module shown in FIG. 4A.

FIG. 4C illustrates an optical axis alignment procedure of the optical module shown in FIG. 4A. Referring to FIG. 4C, the optical module includes at least one planar optical waveguide 410-1 and at least one optical connection block 420a-1 and 420b-1 inserted into a corresponding groove formed on the planar optical waveguide 410-1.

The planar optical waveguide 410-1 is includes a plurality of waveguides, at least one groove, and a plurality of metal electrodes 414a-1 and 414b-1 formed on a part of the corresponding groove while being exposed.

The optical connection blocks 420a-1 and 420b-1 include bodies 422a-1 and 422b-1, optical fibers embedded in the bodies 422a-1 and 422b-1, and metal wiring 423a-1 and 423b-1 formed on the lower surface of the bodies 422a-1 and 422b-1. The lower surface of the bodies 422a-1 and 422b-1, on which the metal wiring 423a-1 and 423b-1 are formed, is seated in the corresponding groove in such a manner that it faces the base surface of the corresponding groove.

The metal wiring 423a-1 and 423b-1 are electrically connected to the metal electrodes 414a-1 and 414b-1 in the groove. Electric currents may be applied to the metal wiring 423a-1 and 423b-1 and the metal electrodes 414a-1 and 414b-1. The detected current intensity is used to perform optical axis alignment on the optical connection blocks 420a-1 and 420b-1 and the planar optical waveguide 410-1.

More specifically, the electric currents are applied during the optical axis alignment procedure of the planar optical waveguide 410-1 and the optical connection blocks 420a-1 and 420b-1. The intensity of the electric current is continuously monitored to align the optical axis of the planar optical waveguide 410-1 and the optical connection blocks 420a-1 and 420b-1.

Figure 4D:
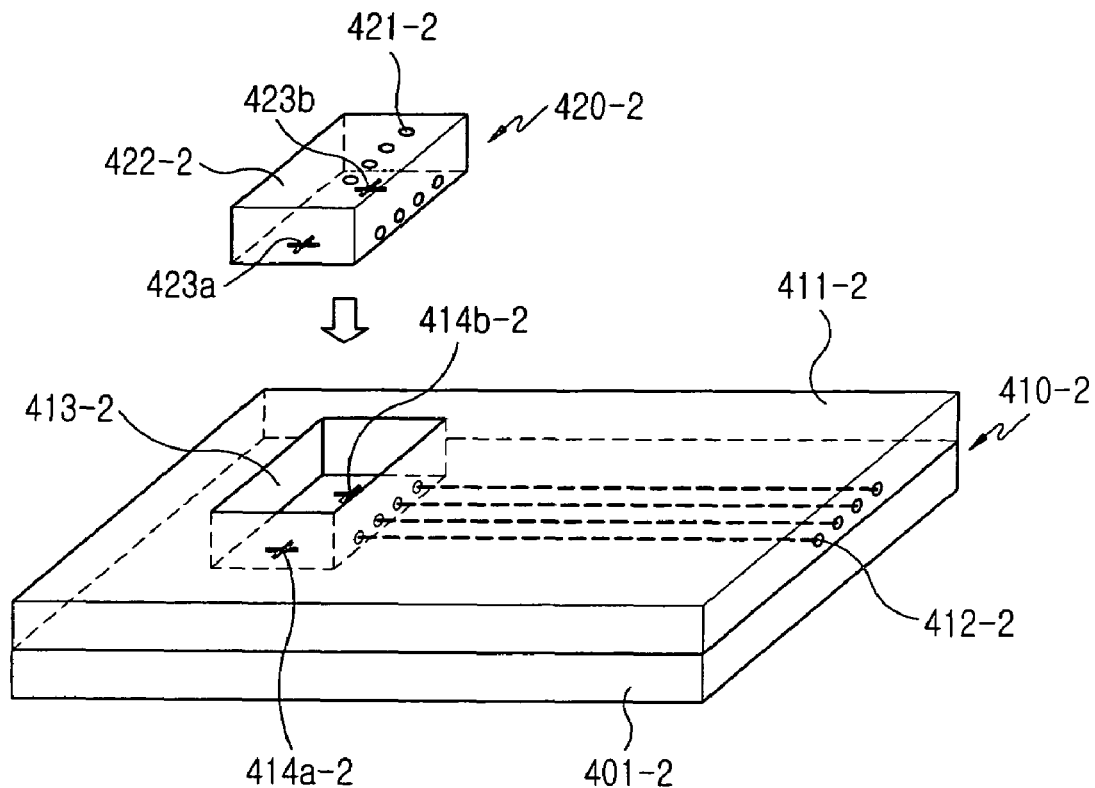
FIG. 4D illustrates an optical axis alignment procedure of the optical module shown in FIG. 4A.

FIG. 4D illustrates an optical axis alignment procedure of the optical module shown in FIG. 4A. The optical module shown in FIG. 4D includes a PCB (not shown) having integrated photoelectric conversion devices, a planar optical waveguide 410-2 having at least one groove 413-2 formed thereon, and at least one optical connection block 420-2. An optical axis alignment method of the optical module includes the steps of forming at least two first alignment patterns 414a-2 and 414b-2 on a portion of a substrate 401-2 where the groove 413-2 is formed; forming second alignment patterns 423a-2 and 423b-2, which correspond to the first alignment patterns 414a-2 and 414b-2, on the optical connection block 420-2; and seating the optical connection block 420-2 in the corresponding groove 413-2 in such a manner that the second alignment patterns 423a-2 and 423b-2 contact the first alignment patterns 414a-2 and 414b-2 of the corresponding groove 413-2.

The optical connection block 420-2 is held in the corresponding groove 413-2 using a die bonding method by means of epoxy, which is injected into the groove 413-2, or a metal bump, which is formed on the base surface of the groove 413-2.

Figure 4E:
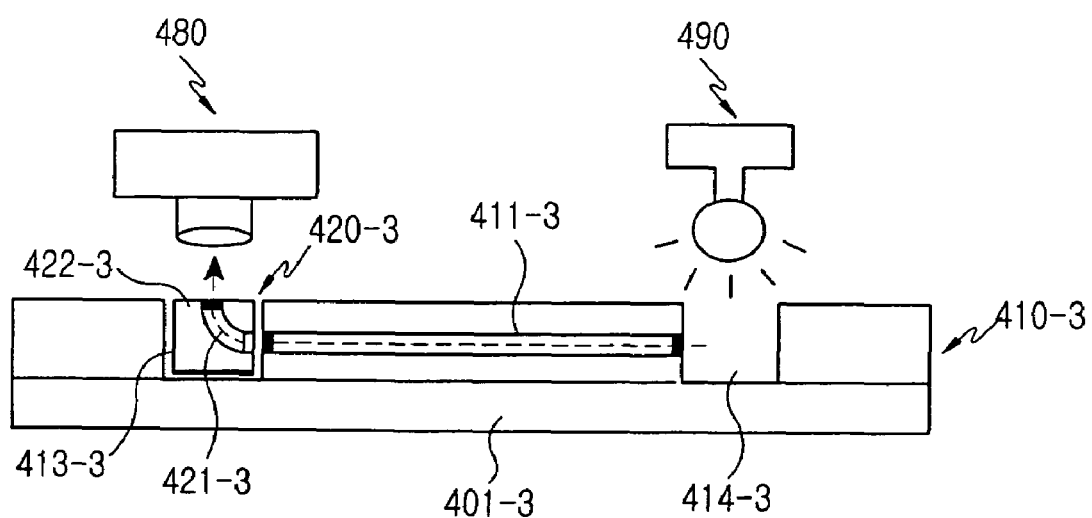
FIG. 4E illustrates an optical axis alignment procedure of the optical module shown in FIG. 4A.

FIG. 4E illustrates an optical axis alignment procedure of the optical module shown in FIG. 4A. The optical module shown in FIG. 4E includes a planar optical waveguide 410-3 having at least one groove 413-3 and 414-3 formed thereon and an optical connection block 420-3. The optical axis alignment method of the optical module includes the steps of inserting the optical connection block 420-3 into corresponding grooves 413-3 and 414-3, irradiating light on an end of a waveguide 411-3 of the planar optical waveguide 410-3, and aligning the optical connection block 420-3 to the corresponding grooves 413-3 and 414-3 of the planar optical waveguide 410-3 while detecting the light, which has been irradiated on the end of the waveguide 411-3, through an optical fiber 421-3 of the optical connection block 420-3.

As a light source 490 for generating light, interferential or non-interferential light source may be used. As an optical detector 480 for detecting the light, a photodiode may be used.

Figure 5:
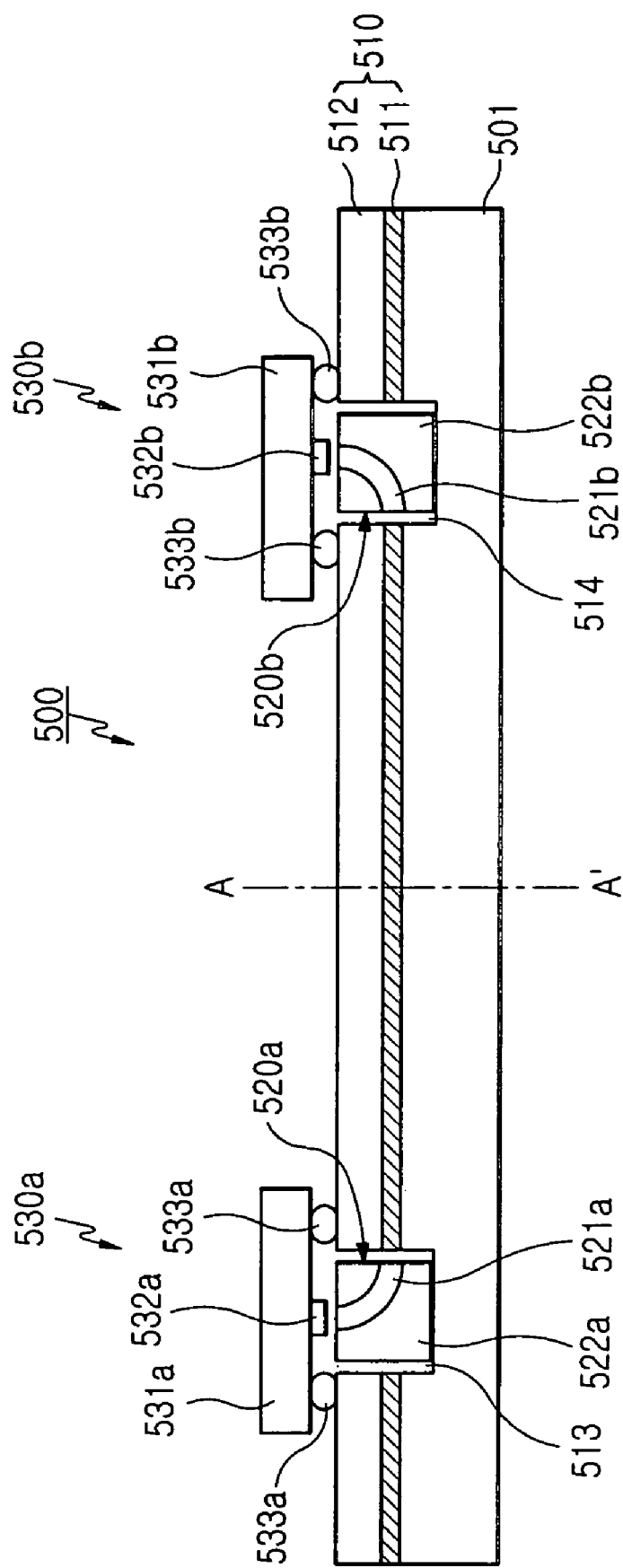
FIG. 5 shows an optical module including an optical connection block according to a fifth embodiment of the present invention.
Figure 6:
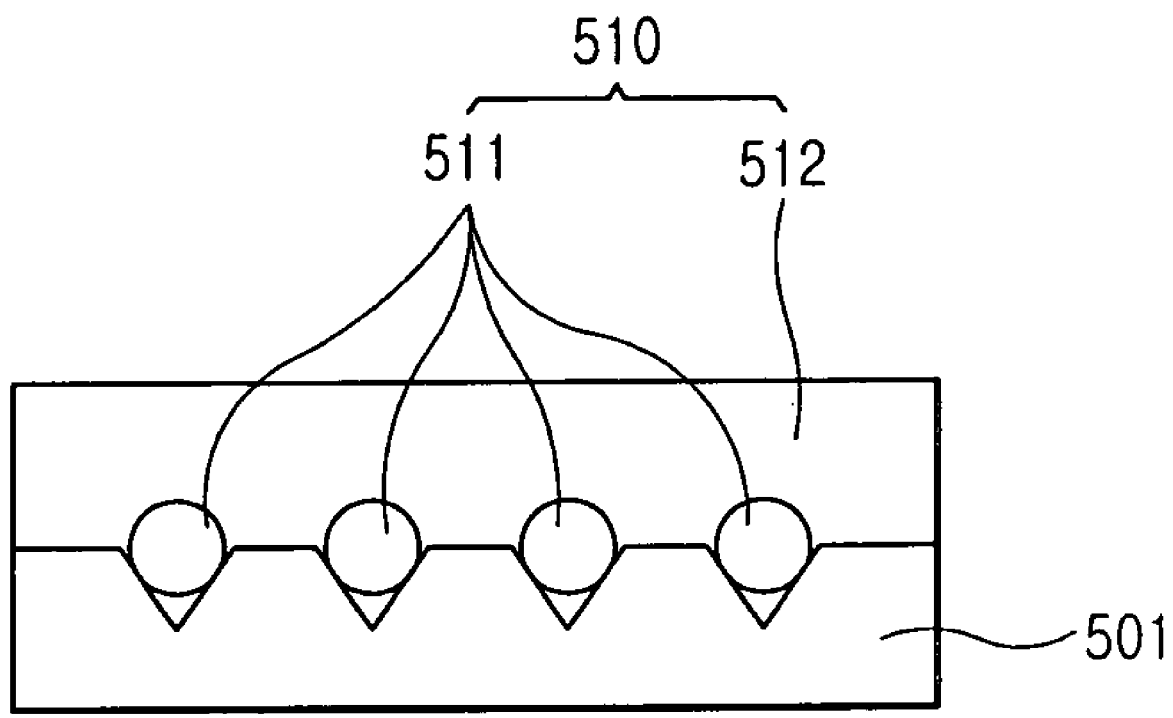
FIG. 6 is a sectional view showing the structure of a planar optical waveguide shown in FIG. 5.

FIG. 5 shows an optical module including an optical connection block according to a fifth embodiment of the present invention. FIG. 6 is a sectional view showing the structure of a planar optical waveguide shown in FIG. 5. Referring to FIG. 5, an optical module 500 includes a substrate 501, an optical fiber block 510 formed on the substrate 501, at least one PCB 530a and 530b, and a plurality of optical connection blocks 520a and 520b. The substrate 501 has a plurality of V-grooves formed on the upper surface thereof.

Referring to FIG. 6, which is a sectional view taken along line A-A' of FIG. 5, the optical fiber block 510 includes a plurality of first optical fibers 511 seated on the respective V-grooves of the substrate 501 and an upper block 512 for covering the substrate 501, on which the first optical fibers 511 are seated. The upper block 512 has a plurality of V-grooves (not shown) for holding the first optical fibers 511 in a stable manner.

The construction of the optical module 500 is the same as that of the second embodiment of the present invention, and repeated descriptions thereof will be omitted.

Figure 7:
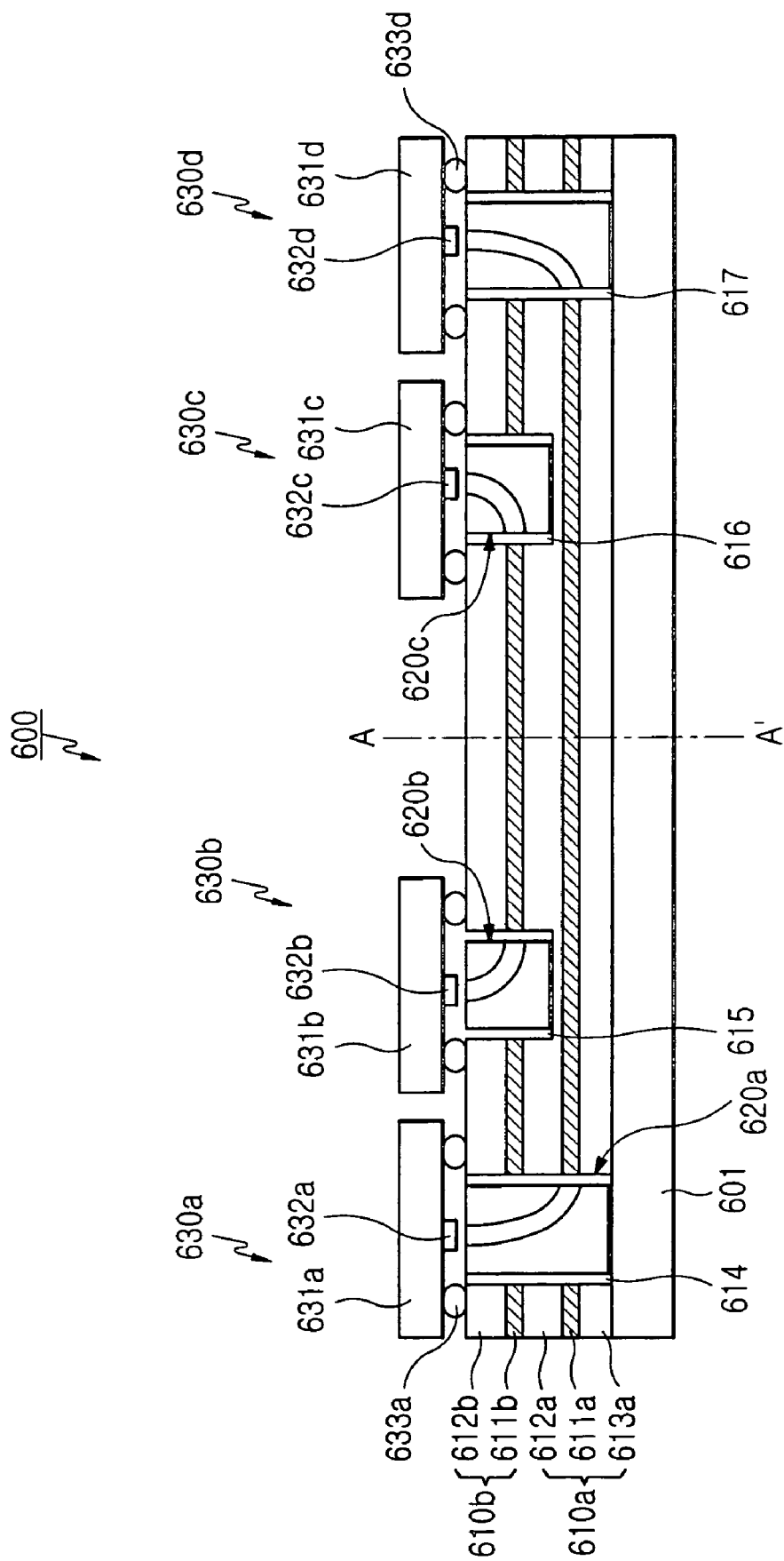
FIG. 7 shows an optical module including an optical connection block according to a sixth embodiment of the present invention.
Figure 8:
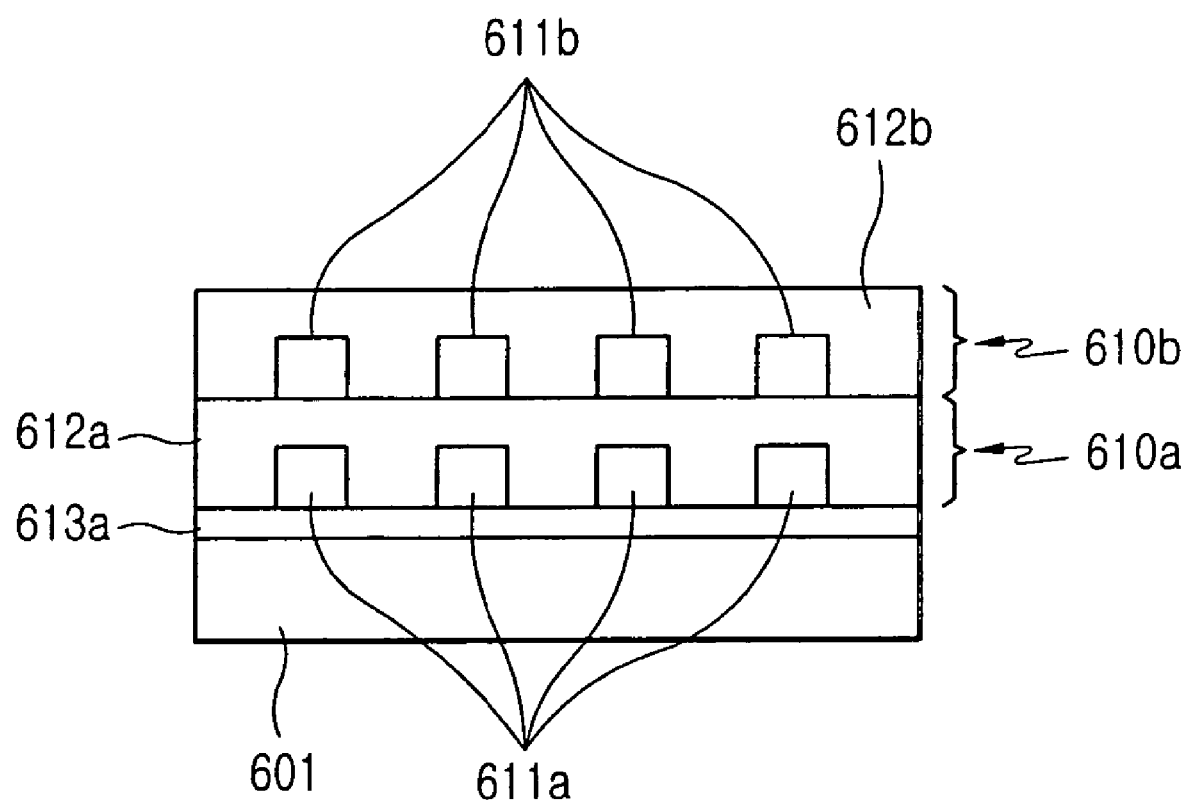
FIG. 8 is a sectional view showing the structure of a planar optical waveguide shown in FIG. 7.

FIG. 7 shows an optical module 600 including an optical connection block according to a sixth embodiment of the present invention. FIG. 8 is a sectional view showing the structure of a planar optical waveguide shown in FIG. 7. Referring to FIG. 7, the optical module 600 includes a substrate 601, at least one planar optical waveguide 610a and 610b successively laminated on the substrate 601, at least one PCB 630a, 630b, 630c, and 630d, and a plurality of connection blocks 620a, 620b, 620c, and 620d.

Referring to FIG. 8, which is a sectional view taken along line A-A' of FIG. 7, the planar optical waveguides 610a and 610b include a first planar optical waveguide 610a successively formed on the substrate 601 by a semiconductor process and a second planar optical waveguide 610b formed on the first planar optical waveguide 610a. The first and second planar waveguides 610a and 610b include a plurality of waveguides 611a and 611b and at least one groove 614, 615, 616, and 617.

The first planar optical waveguide 610a has a first clad 611a, a core, and a second clad 612a that are successively laminated on the substrate 601. The core is etched to form a plurality of waveguides 611a. In order to form the second planar optical waveguide 610b, another core layer is laminated on the second clad 612a of the first planar optical waveguide, and the core layer is etched to form a plurality of waveguides 611b. The second planar optical waveguide 610b has a third clad 612b formed on the waveguides 611b. One feature of the structure of this embodiment is that the volume is minimized and the processing capacity is improved. For clarity, repeated descriptions of the same components as in other embodiments of the present invention will be omitted.

Figure 9:
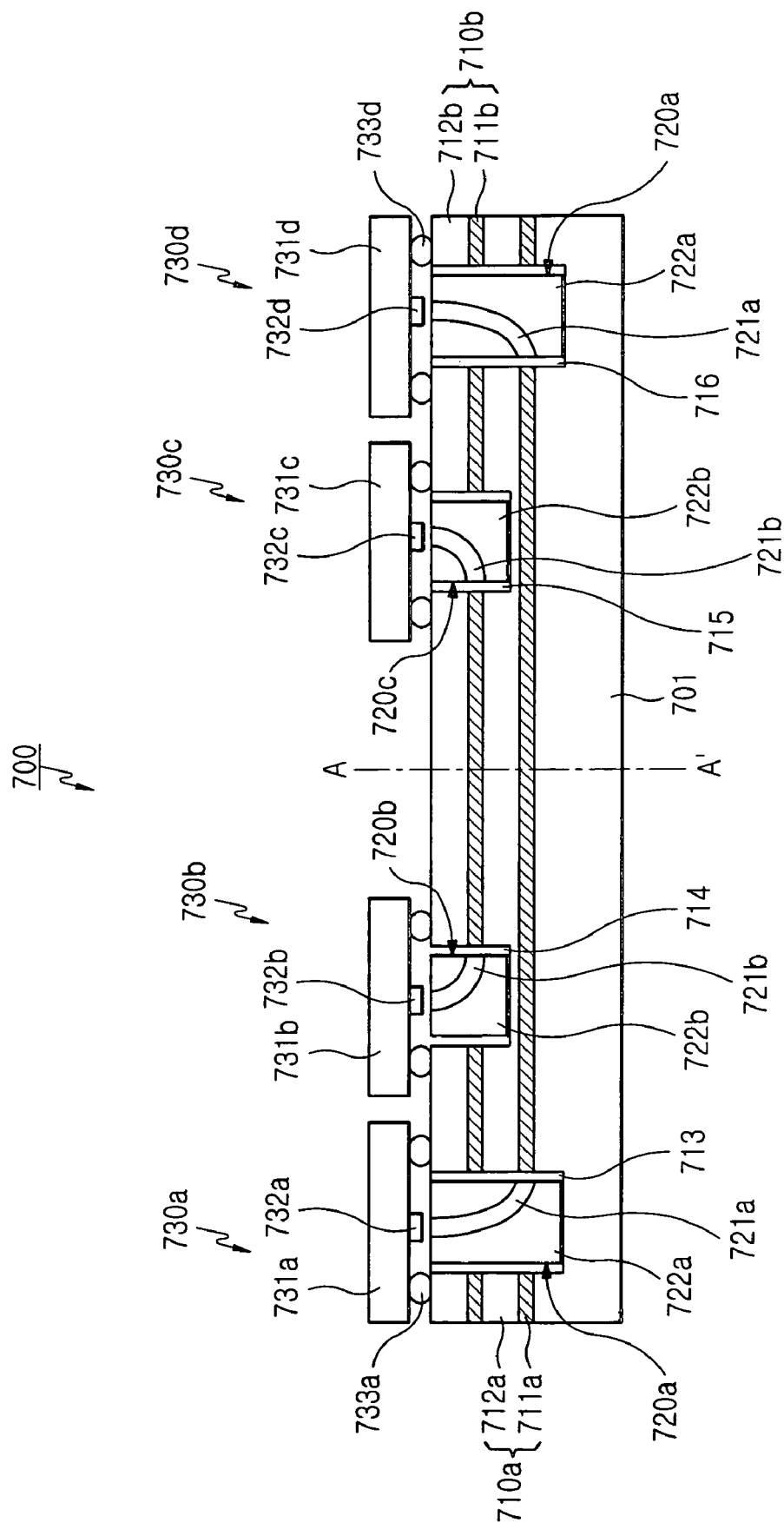
FIG. 9 shows an optical module including an optical connection block according to a seventh embodiment of the present invention.
Figure 10:
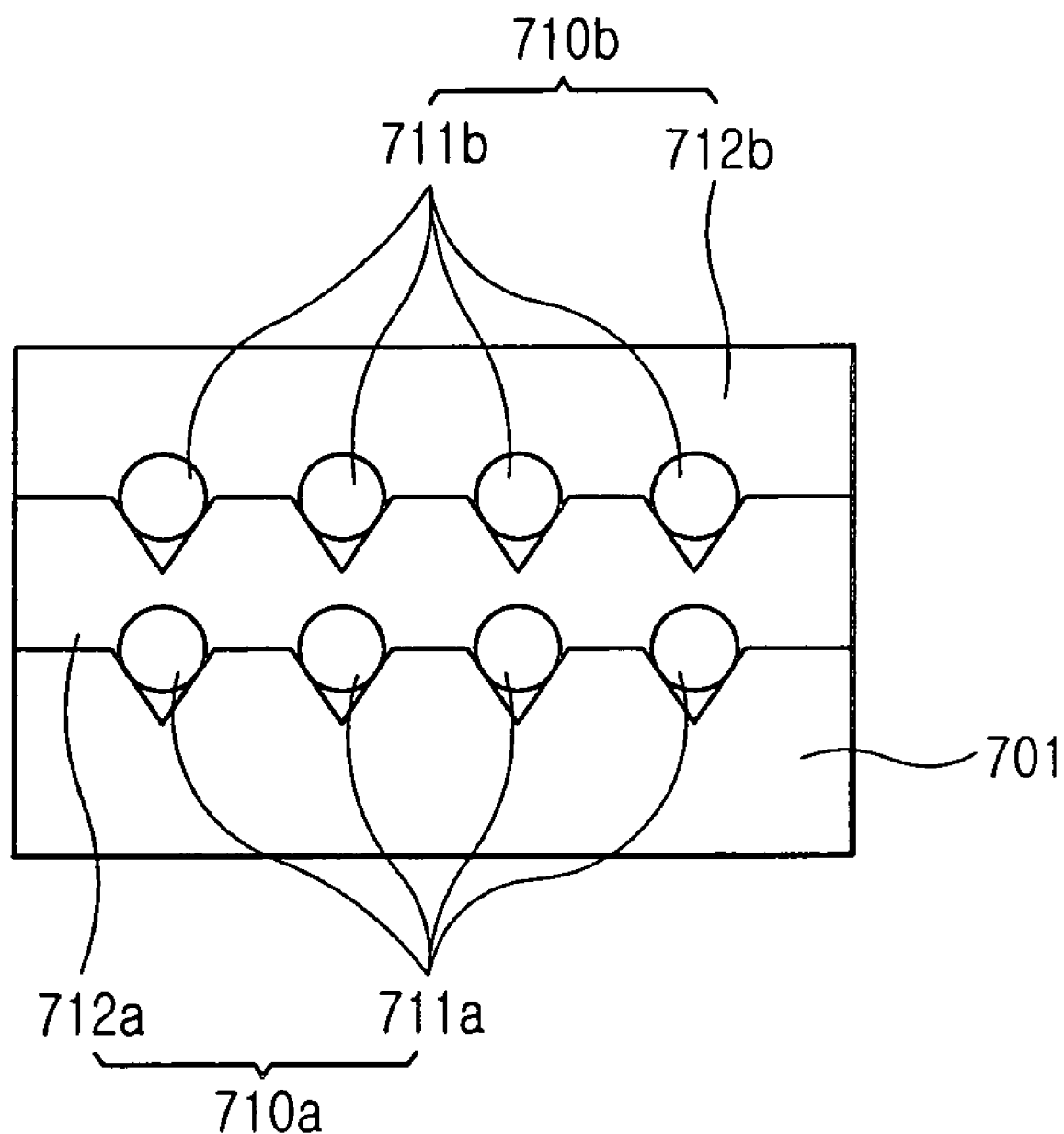
FIG. 10 is a sectional view showing the structure of a planar optical waveguide shown in FIG. 9.

FIG. 9 shows an optical module 700 including an optical connection block according to a seventh embodiment of the present invention. FIG. 10 is a sectional view taken along line A-A' of FIG. 9. The optical module 700 includes a substrate 701, at least one optical fiber block 710a and 710b successively laminated on the substrate 701, PCBs 730a, 730b, 730c, and 730d having at least one integrated photoelectric conversion device, and at least one optical connection block 720a, 720b, 720c, and 720d inserted into respective grooves 713, 714, 715, and 716 formed on the optical fiber blocks 710a and 710b.

Referring to FIG. 10, the substrate 701 has a plurality of V-grooves formed on the upper surface thereof. The optical fiber blocks 710a and 710b include a first optical fiber block 710a, which includes a first row of first optical fibers 711a seated in the V-grooves of the substrate 701 and an intermediate block 712a covering the substrate 701 for holding the first optical fibers 711a, and a second optical fiber block 710b positioned on the first optical fiber block 710a. The intermediate block 712a covers the substrate 701 with its lower surface and has a plurality of V-grooves formed on its upper surface to support the first or second row of first optical fibers 711a and 711b.

The second optical fiber block 710b includes a second row of first optical fibers 711b, which are seated in the V-grooves of the intermediate block 712a, and an upper block 712b for covering the intermediate block 712a. The upper block 712b has a plurality of V-grooves (not shown) formed on its lower surface, which contacts the intermediate block 712a, to hold the second two row of first optical fibers 711b in a stable manner.

The first to fourth optical connection blocks 720a, 720b, 720c, and 720d are seated in the corresponding grooves 713, 714, 715, and 716 of the first and second optical fiber blocks 710a and 710b to connect the corresponding PCBs 730a, 730b, 730c, and 730d to the corresponding rows of first optical fibers 711a and 711b. The first to fourth optical connection blocks 720*a*, 720*b*, 720*c*, and 720*d* have the same structure as that of the optical connection blocks according to the first to third embodiments of the present invention, and repeated descriptions thereof will be omitted.

Figure 11:
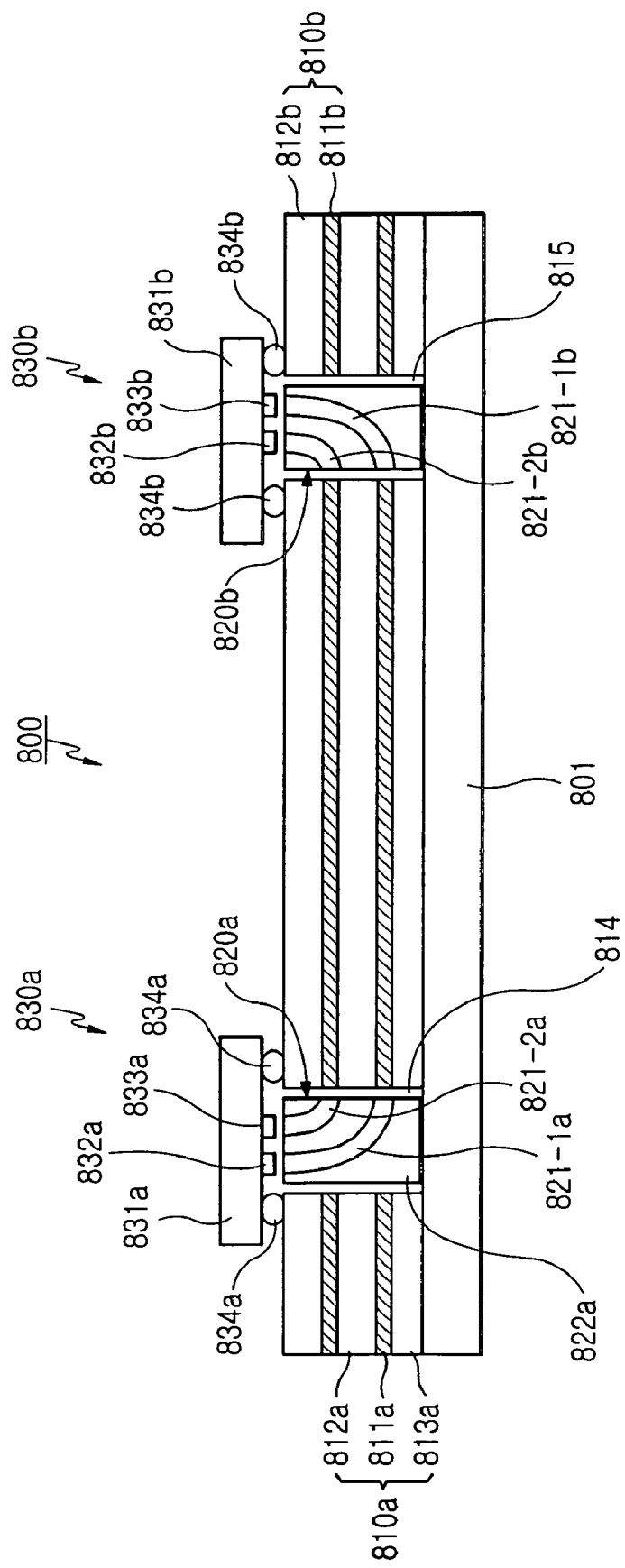
FIG. 11 shows an optical module including an optical connection block according to an eight embodiment of the present invention.
Figure 12:
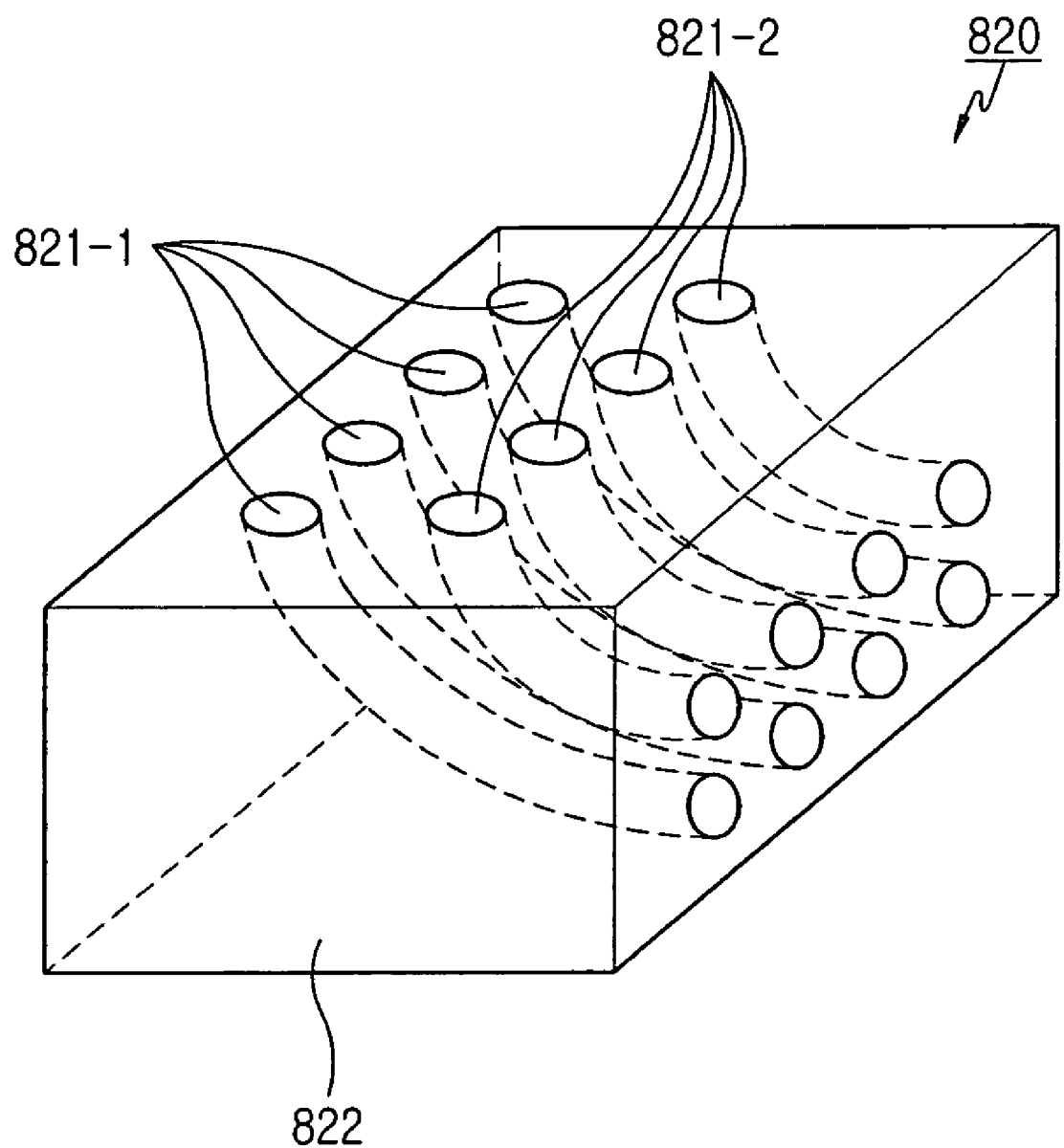
FIG. 12 is a sectional view showing the structure of the optical fiber block shown in FIG. 11.

FIG. 11 shows an optical module 800 including an optical connection block according to an eight embodiment of the present invention. FIG. 12 is a sectional view showing the structure of an optical fiber block shown in FIG. 11.

Referring to FIGS. 11 and 12, the optical module 800 includes a substrate 801, at least one planar optical waveguide 810*a* and 810*b* successively laminated on the substrate 801, at least one PCB 830*a*, 830*b*, 830*c*, and 830D, and a plurality of optical connection blocks 820*a* and 820*b*.

The planar optical waveguides 810*a* and 810*b* and the PCBs 830*a* and 830*b* of the optical module 800 have the same structure as in the case of the seventh embodiment of the present invention show in FIG. 9 and repeated descriptions thereof will be omitted. The optical module 800 shown in FIG. 11 has a groove contacting the upper surface of the substrate 801.

The optical connection blocks 820*a* and 820*b* include optical fibers 821 corresponding to the waveguides 811*a* and 811*b* and a body 822 for supporting the optical fibers 821-1 and 821-2. The optical fibers 821-1 and 821-2 include a first row of optical fibers 821-1*a* and 821-1*b* corresponding to the waveguides 811*a* of the first planar optical waveguide 810*a* and a second row of optical fibers 821-2*a* and 921-2*b* corresponding to the waveguides 811*b* of the second planar optical waveguide 810*b*. The first and second rows of optical fibers 821-1 and 821-2 have both ends thereof bent with a predetermined curvature so that they face the corresponding waveguides and PCBs.

The body 822 may be formed as a single body by applying plastic material, such as epoxy resin, polyamide resin, phenol resin, and wax, or other material, such as glass, ceramic, and metal, around the optical fibers 821-1 and 821-2, which are arranged in two rows. The body 822 may then be cured in to an appropriate shape, e.g., cuboid. The body 822 has lateral and upper surfaces thereof, to which the optical fibers are exposed, polished into smooth surfaces so that scattering due to irregular reflection of input/output optical signals, as well as resulting noise and intensity loss, can be suppressed.

Figure 13:
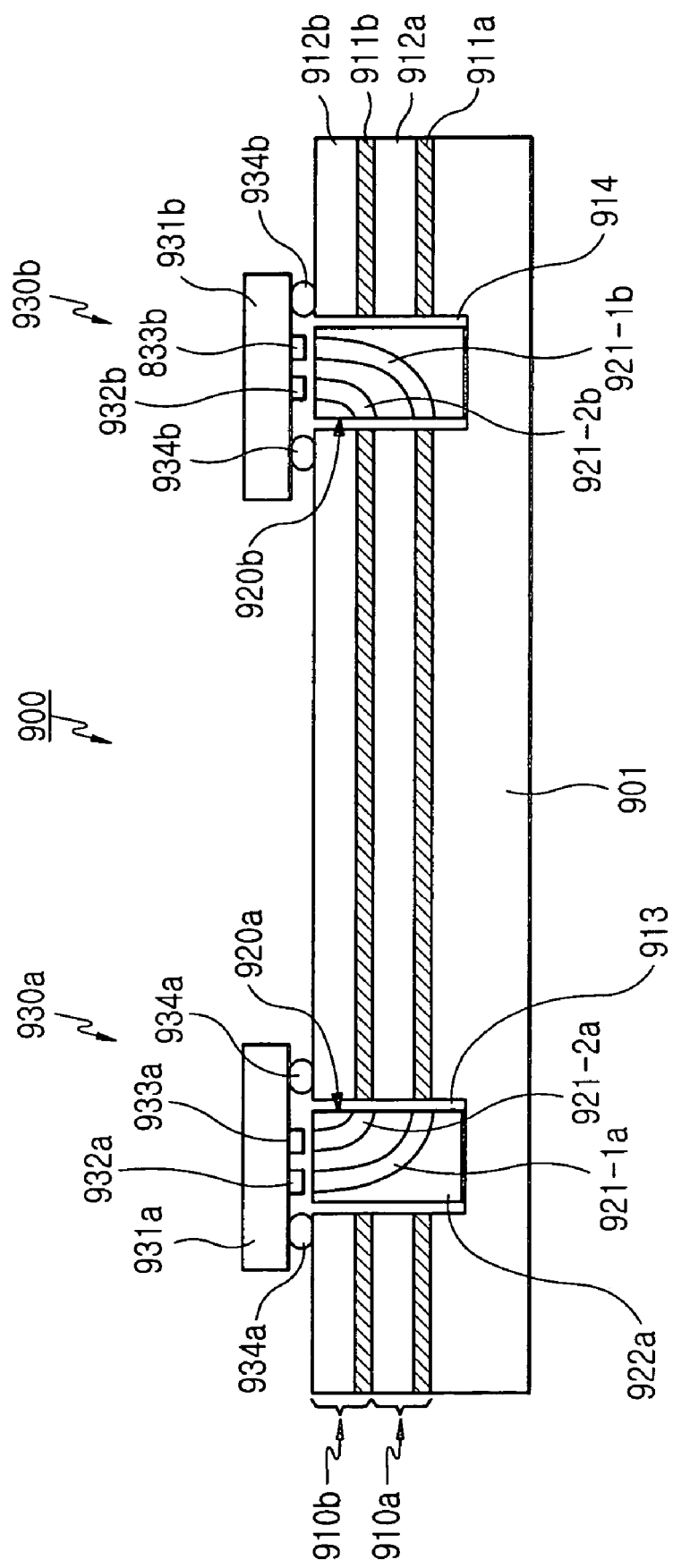
FIG. 13 shows an optical module including an optical connection block according to a ninth embodiment of the present invention.

FIG. 13 shows an optical module 900 including an optical connection block according to a ninth embodiment of the present invention. The optical module 900 includes a substrate 901, at least one optical fiber block 910*a* and 910*b* successively laminated on the substrate, at least one PCB 930*a* and 930*b*, and a plurality of optical connection blocks 920*a* and 920*b*.

The optical fiber block includes first and second optical fiber blocks 910*a* and 910*b* successively formed on the substrate 901. The first and second optical fiber blocks 910*a* and 910*b* include first optical fibers 911*a* for inputting/outputting optical signals, as well as intermediate and upper blocks 912*a* and 912*b* for holding the first optical fibers 911*a*. The first and second optical fibers 911*a* and 911*b* have the same structure as disclosed in the seventh embodiment of the present invention shown in FIG. 10.

The optical connection blocks 920*a* and 920*b* include a plurality of second optical fibers 921-1*a*, 921-1*b*, 921-2*a*, and 921-2*b*, which correspond to the first optical fibers 911*a* one by one, and bodies 922*a* and 922*b* for holding the second optical fibers 921-1*a*, 921-1*b*, 921-2*a*, and 921-2*b*. The optical connection blocks 920*a* and 920*b* are inserted and seated in at least one groove 913 and 914 formed on the optical fiber blocks 910*a* and 910*b* to connect the PCBs 930*a* and 930*b* to the corresponding first optical fibers 911*a* and 911*b*. The second optical fibers 921-1*a*, 921-1*b*, 921-2*a*, and 921-2*b* are arranged in two rows so that they correspond to the first and second optical fiber blocks 910*a* and 910*b*, respectively.

The optical connection blocks 920*a* and 920*b* according to the ninth embodiment of the present invention have the same structure as that of the optical connection blocks described with reference to the eight embodiment of the present invention, and repeated descriptions thereof will be omitted.

The PCBs 930*a* and 930*b* have integrated photoelectric conversion devices 932*a*, 933*a*, 932*b*, and 933*b* that convert electric signals into optical signals and are positioned on the second optical fiber block 910*b* in such a manner that each light-receiving or light-emitting surface of the photoelectric conversion devices 932*a*, 933*a*, 932*b*, and 933*b* faces an end of the optical connection blocks 920*a* and 920*b*.

As mentioned above, the various embodiments directed to optical connection blocks include optical fibers bent with a predetermined angle that make it easier to perform optical axis alignment and that are easier to manufacture, as compared to conventional devices. Since the end surface of the optical fibers is processed with 90°, any additional process for cutting the end surface with a slant of 45° and for depositing a mirror thereon is unnecessary.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical connection block comprising:
a body including a lateral surface and an upper surface;
an electrically conductive wiring;
at least one optical fiber having two ends and embedded in the body in such a manner that said ends are exposed to the lateral and upper surfaces of the body, respectively, wherein said body is configured to be seated down in a groove in a upper surface of an optical structure to thereby lower the end exposed to the lateral surface into optical alignment with a waveguide in said structure, and wherein said electrically conductive wiring is configured such that the seating down of the body lowers said electrically conductive wiring into position for electrical communication with an element in said optical structure, to afford adjustment of said optical alignment based on said electrical communication.

2. An optical connection block as claimed in claim 1, wherein the body includes a plurality of alignment patterns formed for optical axis alignment.

3. An optical connection block as claimed in claim 2, wherein the alignment patterns include a metallic material.

4. An optical connection block as claimed in claim 1, wherein the body includes a plastic material chosen from a group consisting of epoxy resin, polyamide resin, phenol resin, and wax.

5. An optical connection block as claimed in claim 1, wherein the body includes a material chosen from a group consisting of glass, ceramic, and metal.

6. An optical connection block as claimed in claim 1, wherein the lateral and upper surfaces are polished.

7. An optical connection block as claimed in claim 1, wherein the optical fibers include silica or plastic optical fibers.

8. An optical axis alignment method for an optical module including a planar optical waveguide having at least one groove and optical connection blocks, the method comprising the steps of:

creating at least two metal electrodes on the planar optical waveguide in such a manner that they are exposed to a base surface of the groove;

forming metal wiring for electrically connecting the metal electrodes to a surface of the optical connection blocks, which contacts the base surface of the groove;

seating the optical connection blocks in the groove;

applying currents to the metal electrodes; and aligning the optical connection blocks to the planar optical waveguide according to a change of current detected through the metal electrodes.

* * * * *

UNITED STATES PATENT AND TRADEMARK OFFICE
CERTIFICATE OF CORRECTION

PATENT NO.        : 7,263,256 B2
APPLICATION NO.   : 10/959884
DATED             : August 28, 2007
INVENTOR(S)       : Dong-Su Kim et al.

It is certified that error appears in the above-identified patent and that said Letters Patent is hereby corrected as shown below:

Title Page
Item [73], Assignee's address, should read as follows:

--Gyeonggi-Do.--

Signed and Sealed this

Thirteenth Day of November, 2007

JON W. DUDAS
*Director of the United States Patent and Trademark Office*